United States Patent [19]

Dupree

[11] 4,383,080

[45] May 10, 1983

[54] PROCESS FOR CURING POLY(ARYLENE SULFIDES)

[75] Inventor: Robert L. Dupree, Houston, Tex.

[73] Assignee: Phillips Petroleum Company, Bartlesville, Okla.

[21] Appl. No.: 365,204

[22] Filed: Apr. 5, 1982

[51] Int. Cl.³ .................................................. C08F 283/00
[52] U.S. Cl. .................................... 525/537; 525/535; 528/373; 528/374; 528/388
[58] Field of Search ....................... 528/388, 373, 374; 525/535, 537

[56] References Cited

U.S. PATENT DOCUMENTS 3,793,256  2/1974  Scoggin ............................... 528/388
4,251,575  2/1981  Brady et al. ......................... 427/400

Primary Examiner—Melyn I. Marquis

[57] ABSTRACT

A poly(arylene sulfide) polymer is cured in the presence of an ozone containing gas thereby reducing the time required for the curing process.

11 Claims, No Drawings

PROCESS FOR CURING POLY(ARYLENE SULFIDES)

BRIEF SUMMARY OF THE INVENTION

An improved process for the curing of poly(arylene) sulfides is provided by curing the resin with an ozone containing gas under temperature conditions below its melting point.

DETAILED DESCRIPTION OF THE INVENTION

This invention relates to a process for curing poly(arylene sulfide) polymers. In one of its aspects the invention provides for a process to increase the rate of curing poly(arylene sulfide) polymers. In another of its aspects the invention provides for employing a gas containing ozone to increase the rate of curing poly(arylene sulfide) polymers.

Poly(arylene sulfide) polymers ranging in consistency from viscous liquids to crystalline solids are known. While such polymers exhibit desirable properties for many applications such as molding compositions, the unmodified polymers normally possess a relatively high melt flow, e.g., above 4,000, which inhibits their use. For example, when exposed to process temperatures above their melting point the unmodified polymers tend to surface pre-cure only and require excessive processing times or special apparatus for thin film processing. Since the desirable properties make the polymers extremely useful, it would be advantageous to improve the processability of the solid polymers without materially affecting the desirable properties. Additionally while polymers of this type exhibit desirable properties for many applications such as molding compositions, the unmodified polymers, e.g., obtained directly from the reactors, normally possess a high melt flow which limits their use in certain instances. Such polymers, i.e., the unmodified materials, possess a very low melt viscosity which makes it difficult to handle them by conventional molding practices.

The virgin poly(arylene sulfide) resin has a very high melt flow and it is known that it has to be cured in order to make it possible to use it extensively. The extent of cure and the final melt flow which is attained depends upon the end use to which the polymer is to be put. For example, a fairly high melt flow can be used for fluid bed coating of metals while, for injection molding or compression molding, a much lower melt flow is desirable.

It is also known in the art that poly(arylene sulfide) resins can be cured by contacting the resins in the presence of an oxygen containing gas such as air at a temperature below the melting point of the resin for a period of time sufficient to substantially reduce the melt flow of the resin. This process requires about twenty hours or more to cure a batch of polymer and from time-to-time this delay can cause a bottleneck to the overall process for the production of the particular poly(arylene sulfide) polymer involved. This bottleneck is highly undesirable and results in increased inefficiency for the whole poly(arylene sulfide) polymer production process.

It is thus an object of this invention to provide a process for eliminating the bottleneck in the overall process for the production of poly(arylene sulfides) by increasing the rate of curing of poly(arylene sulfides).

Other aspects, objects, and the several advantages of the present invention will be apparent from a study of this disclosure and the appended claims.

In accordance with the present invention, it has been discovered that by curing a poly(arylene sulfide) resin in the presence of an ozone containing gas at a temperature below the melting point of the resin, that a significant decrease in time is required to achieve adequate cure.

The term "poly(arylene sulfide) polymer" as used in this specification is intended to include polymers of the type which are prepared as described in U.S. Pat. No. 3,354,129, issued Nov. 21, 1967, to Edmonds and Hill. As disclosed in this patent, these polymers can be prepared by reacting a polyhalo-substituted cyclic compound containing unsaturation between adjacent ring atoms and an alkali metal sulfide in a polar organic compound. The resulting polymer contains the cyclic structure of the polyhalo-substituted compound coupled in repeating units through a sulfur atom. The polymers which are preferred for use in this invention, because of their high thermal stability and availability of the materials from which they are prepared, are those polymers having the repeating unit —R—S— where R is phenylene, biphenylene, naphthylene, biphenylene ether or a lower alkyl-substituted derivative thereof. By "lower alkyl" is meant alkyl groups having one to six carbon atoms such as methyl, propyl, isobutyl, n-hexyl, and the like. The preparation of such polymers is quite well disclosed in the above patent of Edmonds et al.

The polymers of this invention are preferably those which have melting temperatures above about 390° F. These poly(arylene sulfide) polymers can have a melting temperature anywhere in the range from about 390° F. to 940° F. Polymers of poly(phenylene sulfide) normally have melting temperatures in the range from about 500° F. to about 900° F.

This invention can be used with resins manufactured by the method described in British Pat. No. 962,941 wherein metal salts of halothiophenols are heated at a polymerizing temperature. The invention is especially useful with polymers produced by reacting anhydrous sodium sulfides with polyhalo-substituted cyclic compounds in polar organic solvents as disclosed in U.S. Pat. No. 3,354,129. The invention can be used with linear polymers formed by use of dihalo aromatic compounds or with crosslinked polymers wherein polyhalo aromatic compounds are added to the polymer to aid crosslinking.

It is to be understood that the properties of the polymeric material modified according to the invention can vary appreciably depending upon the nature of the starting material such as the molecular weight and melt viscosity and the like. The length of time and temperature of the heat treatment can also be used to vary the properties within wide limits, it being understood that even under the mildest treatments some improvement in heat stability and processing capability is obtained.

In accordance with the invention, the polymer is heated to a temperature which is below the melting point of the chosen polymeric product for a period of time sufficient to effect cure and reduce the melt flow in the presence of an ozone containing gas. The melting point of poly(arylene sulfide) polymers can be readily determined by the conventional procedure of differential thermal analysis, (DTA), by heating a 10 mg sample of the polymer at a rate of 10° C. per minute. The melting point is taken from the DTA thermogram in a conventional manner. The temperature will vary within the range of about 200° F. to about 1,000° F. depending upon the molecular weight and nature of the polymeric product being treated. Generally, the treatment temperature will be in the range of from about 25° F. to about 125° F., preferably from about 50° F. to about 100° F. below the melt point of the polymer being treated.

The time during which the poly(arylene) sulide polymer is to be heated in the presence of an ozone containing gas ordinarily will range in time from a few minutes to 40 hours or higher depending specifically on the type of polymer being processed. The preferred time for heating a poly(arylene sulfide) polymer is one-half to four hours at a temperature in the range of about 50° F. to about 100° F. below the melting point of the polymer.

As indicated above, the heating is carried out in the presence of an ozone containing gas. It is preferred that the gas containing ozone be an oxygen containing gas, more preferably air or oxygen.

The concentration of ozone in the gas can be from about 0.02 to about 50.0 weight percent based on the weight of the gas employed containing oxygen. The preferred range is 0.1 to 0.5 weight percent based on the weight of the gas containing oxygen.

Any suitable ozonater can be used to generate ozone. In the process of the present invention, a gas such as air is passed through the ozonator and mixed with ozone. The air containing ozone is then heated to a temperature below the polymer melting point. Curing can be carried out in conventional equipment such as a quartz tube reactor, a stirred metal vessel, or a Wedco polisher. The reaction temperature can be controlled by any commercially available controller.

The polymers of this invention have utility in any use wherein high melting point and/or a high temperature stability is desired. These polymers can be blended with fillers, pigments, stabilizers, accelerators, softeners, extenders, and other polymers. Such fillers as graphite, carbon black, titania, glass fibers, metal powders, magnesia, asbestos, clays, wood flour, cotton floc, alpha-cellulose, mica, and the like can be employed. They can also be used as coating for metal parts and for encapsulation of electrical wires or circuitry.

The following examples further illustrate the nature and advantages of the present invention.

EXAMPLE I

This example describes the curing of poly(phenylene sulfide) (PPS) with an ozone containing air. The PPS cured had a melt flow rate of about 3,000 which was determined at 316° C. using a ASTM procedure involving a standard orifice and a total load of 5.0 Kg (including the weight of the piston).

A Welsbach Laboratory Model T-816 ozonater was used to generate ozone. Air was passed through the ozonater at a rate of 400 cc/minute and mixed with ozone. The air/ozone mixture was then passed through a quartz tube reactor wrapped with an electric heating tape. The reactor temperature was controlled with a Honeywell controller and was adjusted to about 250° C.

A sample boat was filled with about 7 grams of a poly(phenylene sulfide) resin (melting point about 540° F., melt flow 3,000) powder marketed by Phillips Petroleum Company, was introduced into the heated quartz tube reactor at a temperature of about 250° C. The temperature first decreased to about 210° C. but was increased back to 250° C. within 10 minutes. The PPS sample was kept at 250° C. for 1 hour. Control runs were carried out under the same temperature/air flow conditions, except that the ozonater was not turned on and the air did not contain any ozone.

The ozone content in the air was determined as follows: the air/ozone stream from the ozonator was passed through a gas scrubber containing 225 ml. of an aqueous 2 weight percent KI solution for 8 minutes. Two drops of concentrated $H_2SO_4$ were added to a 125 ml. aliquot of said KI solution, which was then titrated with 0.1 N sodium thiosulfate solution using a starch indicator. The titration required 1.75 ml. of the thiosulfate titrant. Calculations revealed that the air/ozone mixture contained 1204 ppm of ozone or 0.12 weight percent ozone based on the weight of the air. This would be substantially the same as the concentration of ozone in the reactor.

EXAMPLE II

The flow rate of a poly(phenylene sulfide/resin (MP 540° F., MF 3,000) that had been cured for 60 minutes in air with and without ozone was determined in accordance with the procedure described in Example I.

The flow rate of PPS cured in air only was 376 grams/10 minutes.

The flow rate of PPS cured in air/ozone was 51 grams/10 minutes.

This data indicates that curing in the presence of ozone increases the curing rate of PPS at 250° C. by a factor of about 7.4.

EXAMPLE III

The flow rate of PPS that had been cured for 60 minutes at 225° C. in air with and without ozone was determined in accordance with the procedure in Example I.

The flow rate of PPS cured in air only was 499 grams/10 minutes.

The flow rate of PPS cured in air/ozone was 193 grams/10 minutes.

This data indicates that curing in the presence of ozone containing gas increases the curing rate of PPS by a factor of about 2.6 at 225° C.

Reasonable variation and modifications are possible in the scope of the foregoing disclosure and the appended claims.

I claim:

1. In a process for curing a poly(arylene sulfide) resin the improvement which comprises curing said poly(arylene sulfide) resin at a temperature below the melting point of said resin in the presence of an ozone containing gas wherein ozone is present in an amount to effect an increase in the cure rate of said poly(arylene) resin.

2. A process according to claim 1 wherein said poly(arylene sulfide) resin is cured at a temperature in the range of from about 25° to 125° F. below the melting point of said poly(arylene) resin.

3. A process according to claim 1 wherein said ozone containing gas is an oxygen containing gas selected from the group consisting of air and $O_2$.

4. A process according to claim 1 wherein said ozone containing gas is air.

5. A process according to claim 1 wherein said poly(arylene sulfide) resin is poly(phenylene sulfide).

6. In a process for curing a poly(arylene sulfide) resin the improvement which comprises curing said poly(arylene sulfide) resin at a temperature below the melting point of said resin in the presence of an ozone containing gas wherein the amount of ozone employed is in the range of from about 0.02 to about 50.0 weight percent based on the weight of said gas.

7. A process according to claim 6 wherein said poly(arylene sulfide) resin is cured at a temperature in the range from about 25° to 125° F. below the melting point of said poly(arylene sulfide).

8. A process according to claim 7 wherein said resin is cured for a period of time in the range of about 10 minutes to about 40 hours.

9. A process according to claim 6 wherein said ozone containing gas is an oxygen containing gas selected from the group consisting of air and $O_2$.

10. A process according to claim 6 wherein said oxygen containing gas is air.

11. A process according to claim 6 wherein said poly(arylene sulfide) resin is poly(phenylene sulfide).

* * * * *